UNITED STATES PATENT OFFICE.

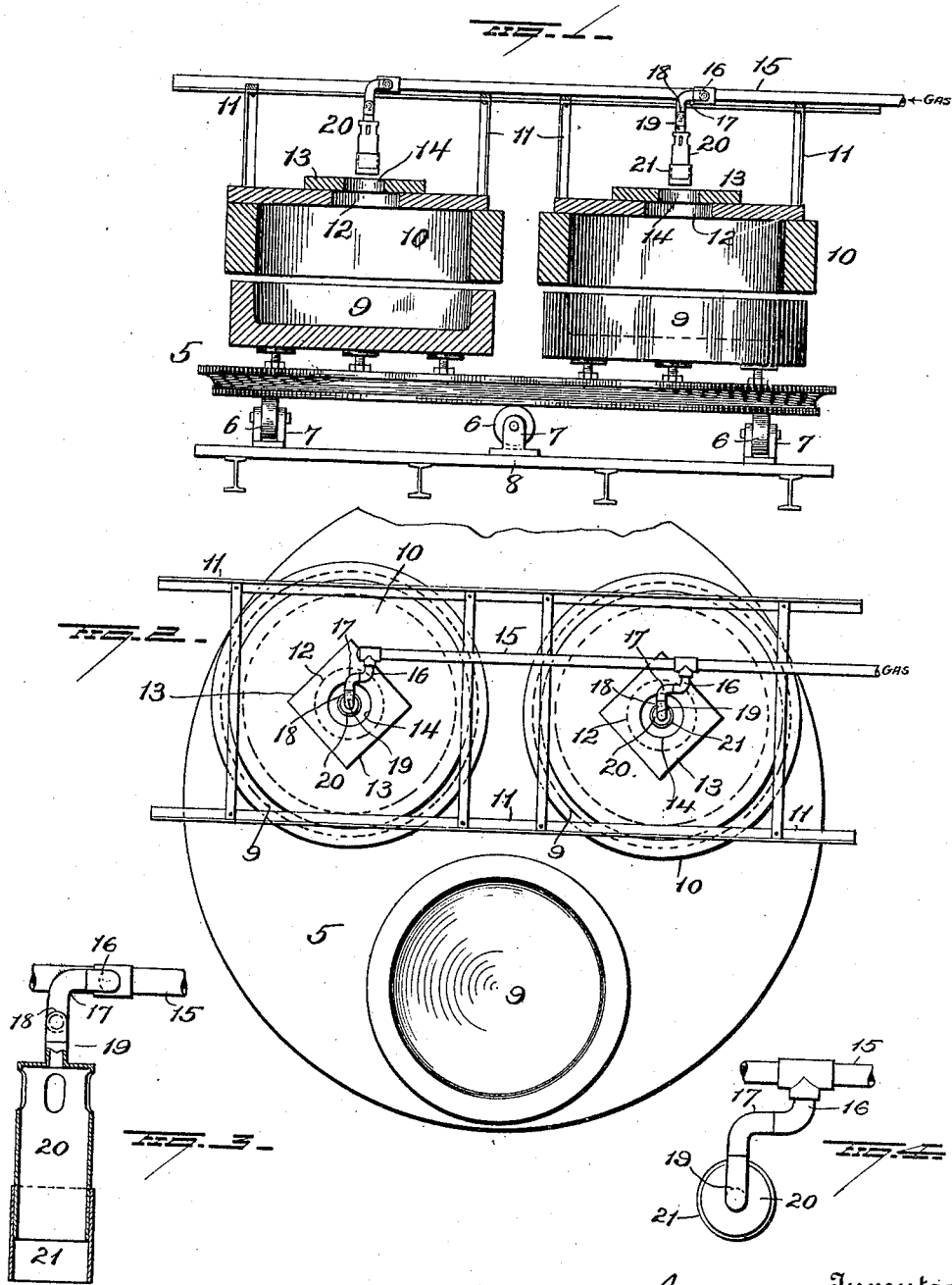

JAMES H. CAMPBELL, OF LANCASTER, OHIO, ASSIGNOR TO THE COLUMBUS GLASS COMPANY, OF LANCASTER, OHIO.

APPARATUS AND METHOD EMPLOYED IN MANUFACTURING OF WINDOW-GLASS CYLINDERS.

1,318,050.        Specification of Letters Patent.        Patented Oct. 7, 1919.

Application filed January 3, 1919. Serial No. 269,525.

*To all whom it may concern:*

Be it known that I, JAMES H. CAMPBELL, a citizen of the United States, and a resident of Lancaster, in the county of Fairfield and State of Ohio, have invented certain new and useful Improvements in Apparatus and Methods Employed in Manufacturing of Window-Glass Cylinders; and I do hereby declare the following to be a full, clear, and exact description of the invention, such as will enable others skilled in the art to which it appertains to make and use the same.

My invention relates to an improvement in apparatus and method employed in the manufacture of window glass cylinders.

In the manufacture of window glass cylinders, any variations in temperature of the surface glass in the pot from which the cylinder is being drawn, causes the cylinder to move off the center and toward one side of the pot, and when this happens the glass at one side of the cylinder will be thicker than the glass at the opposite side, thus producing sheets of unequal thickness which is known in the trade as thick and thin. This condition is frequently caused by unsymmetrical heating of the pot before the glass is ladled into it; from defects in the pot which cause one part to retain or lose heat faster than another part; or from exposure of one side of the pot to heat or to a cold draft while drawing a cylinder.

The object of my invention is to provide means whereby any part of the pot or other glass holding receptacle can be subjected to greater heat than the remaining part, so as to compensate for and correct conditions that may exist due to the pot construction, or to the exposure of a part of the pot or the glass therein to heat or cold during the drawing operation, and it consists in the method of and apparatus for controlling the pot temperature.

In the accompanying drawings, Figure 1 is a view in side elevation, partly in section of an apparatus embodying my invention; Fig. 2 is a view in plan of the same, and Figs. 3 and 4 are views of the burner and pipe for supplying gas to the same.

5 represents a turn table mounted to turn on the rollers 6, carried by brackets 7 secured to the base 8. I have shown a turn table with three pots 9 thereon, simply because I have heretofore used three in that way but I would have it understood that my invention is not limited to a turn table with any particular number of pots thereon, or to a pot or pots on a turn table, as the invention would be equally applicable to a pot mounted on a movable truck or to one seated directly over a furnace, or other fixed support. Where three pots on a turn table are used, they are filled and drawn from in succession, two of the pots being under heating covers or furnaces for heating and draining out the surplus glass, while the third one is being drawn from.

The pots whether on a turn table, truck or fixed support, must be heated, and in the present instance I have represented the heating cover or furnace 10 supported from the frame 11, and so located with relation to the top of the pots 9, that the latter can pass freely under the cover 10, sufficient space being left for the free turning movement of the pots, but not enough to permit of the escape of any great amount of heat from within the furnace or heating cover and pot. If the pot should be supported on a fixed support, the heating cover or furnace would have to be movable.

As shown there are three pots and two heating covers or furnaces so that while drawing glass from one pot the other two will be under the heating covers 10 where they are heated for the purpose of not only melting and draining out the surplus glass left from the drawing operation, but also to heat the pot to put it in condition to receive a new charge of molten glass. The top of each heating cover or furnace 10 is provided centrally with a large hole 12 partly covered by a tile block 13 having an opening 14 smaller than the opening 12 in the heating cover, for the passage of the burner, or the flame from the burner. The burners, one or more for each heating cover, are located over the latter and are connected with a gas supply pipe 15, by joints which permit the burners to be swung in any direction so as to direct the heating flame to any part of the pot, or to the part of the pot which experience and use demonstrate must be heated more than other parts in order to maintain the skin or surface glass in the pot at approximately even temperature, or in other words, to store additional heat in certain part or parts of the pot to prevent a too rapid cooling of the surface glass at said part or parts of the pot. This joint may be a universal joint of any approved form, but I have found that two L-shaped elbow couplings connected as shown in Figs. 3 and 4, provide for the necessary movement of the burners. The main gas supply pipe, is in the construction shown, provided with a branch pipe 16 carrying an L-shaped elbow 17, which in turn carries a second L-shaped elbow 18 to which the burner pipe 19 is attached. Elbow 17 is swiveled to pipe 16 so as to turn thereon, and elbow 18 is swiveled to elbow 17 so that it can turn on the latter, and thus permit the burner to be turned to direct the flame against any part of the interior of pot 9. The burner pipe 19 carries the burner 20 which is preferably provided with a telescopic extension 21 so as to adjust the height of the burner from the refractory block 13 and also change the heating effect of the fire on the pot.

The burners are located over the openings 12 and 14 and when adjusted the block 13 should be similarly adjusted so that its opening will be centered under the burner.

As shown in the drawings two pots are being heated while the third is exposed and in practice would be under the drawing apparatus. This third exposed pot from which the cylinder is being drawn is exposed at its side adjacent the two other pots, to the heat of the two furnaces 10, while the opposite side of the pot is exposed to the outer air and possibly a draft from a door or window, hence it follows that under such condition, the said opposite side of the pot should be more highly heated so as to retard the cooling of the glass at said side and thus prevent material variation in the temperature of the outer surface of the glass. Again the pot may be defective due to imperfect construction or imperfect heat insulation and if so a trial will demonstrate its imperfections to a skilled hand and thus permit him to counteract the same by the proper use of heat in reheating the pots.

With the pots properly heated at the start so as to prevent unequal cooling of the surface glass therein, the cylinder will draw from the center of the pot without any tendency toward lateral movement and the glass produced be of substantially equal thickness throughout the diameter of the cylinder.

Having fully described my invention what I claim as new and desire to secure by Letters-Patent, is:—

1. The method of drawing hollow glass cylinders of substantially uniform thickness consisting in directing a reheating flame against the portion of the pot where the surface glass tends to cool more rapidly so as to superheat said portion, filling the heated pot with melted glass and drawing a cylinder from the latter.

2. In glass drawing apparatus, the combination of a glass drawing pot, a heating cover therefor and an adjustable gas burner for projecting a flame into the cover and against any part of the interior of the pot.

3. In glass drawing apparatus, the combination of a drawing pot, a heating cover for the same, and a gas burner having a universal swiveled joint connection with the gas supply pipe for projecting a flame into the cover and against a particular part of the interior of the pot.

4. In glass drawing apparatus, the combination of a pot, a heating cover for the same, the said cover having an opening in its top, a movable refractory block over said opening and provided with a smaller opening and a gas burner having a universal swiveled joint connection with a gas supply pipe and adapted to discharge through the opening in the refractory block.

5. In glass drawing apparatus, the combination of a pot, a heating cover for the same the said cover having an opening in its top, and a gas burner made of telescopic sections, the said burner having a universal swiveled joint connection with a gas supply pipe.

6. In glass drawing apparatus, the combination of a turn table, a plurality of pots thereon, fixed heating cover or covers for one pot or pots, a gas supply pipe and a gas burner or burners having swiveled joint connections with the gas pipe whereby it can be adjusted to direct the heating flame to any part of the interior of the pot or pots.

In testimony whereof I have signed this specification in the presence of two subscribing witnesses.

JAMES H. CAMPBELL.

Witnesses:
 A. M. FLOWERS,
 J. O. SMOOT.

Copies of this patent may be obtained for five cents each, by addressing the "Commissioner of Patents, Washington, D. C."